United States Patent [19]

Olson et al.

[11] 3,862,356

[45] Jan. 21, 1975

[54] TELEVISION PICTURE MONITOR CAPABLE OF MEASURING A PLURALITY OF SIGNALS

[75] Inventors: Ronald Arthur Olson, Portland, Oreg.; Gerrit Luten, Heerenveen, Netherlands

[73] Assignee: Tektronix, Inc., Beaverton, Oreg.

[22] Filed: Jan. 7, 1972

[21] Appl. No.: 216,001

[52] U.S. Cl. ............... 178/6.8, 358/10, 178/DIG. 4, 179/1 M

[51] Int. Cl. ............................................ H04n 7/02

[58] Field of Search ... 178/5.4 TE, 7.1, 7.2, DIG. 4, 178/DIG. 6, 7.3 R, 5.4 M; 179/1 MN; 328/135, 146, 162, 163; 330/30 D

[56] References Cited

UNITED STATES PATENTS

| | | | |
|---|---|---|---|
| 3,303,493 | 2/1967 | Charbonnier | 328/146 |
| 3,379,826 | 4/1968 | Gray | 178/7.2 |
| 3,402,259 | 9/1968 | Takanashi | 178/DIG. 13 |
| 3,513,400 | 5/1970 | Russell | 328/135 |
| 3,530,381 | 9/1970 | Hogg et al. | 328/146 |
| 3,591,715 | 7/1971 | Rubin | 178/7.1 |
| 3,603,729 | 9/1971 | Sperber | 178/DIG. 33 |
| 3,679,815 | 7/1972 | Lunn | 178/5.4 M |
| 3,700,790 | 10/1972 | Ryley | 178/5.4 M |
| 3,772,462 | 11/1973 | Schneider | 178/5.4 BT |

OTHER PUBLICATIONS

Electronic Integrated Circuits, Franklin C. Fitchen, 1970, pages 122–123.

*Primary Examiner*—Richard Murray
*Assistant Examiner*—Aristotelis M. Psitos
*Attorney, Agent, or Firm*—Adrian J. La Rue

[57] ABSTRACT

A television monitor apparatus is disclosed which is capable of measuring a plurality of input television signals and the differences therebetween without disconnecting one input signal and connecting another. The television picture monitor apparatus includes a plurality of input connectors and amplifier circuits for selectably receiving and amplifying either one of the plurality of input signals or differences between selected two signals thereof by controlling a selection switch provided on a front panel of the television picture monitor apparatus. In the difference mode differential amplifiers employed for amplifying each input signal and the difference between selected two input signals remarkably reduce the common mode signal thereby providing accurate differences in time and color characteristics therebetween.

7 Claims, 3 Drawing Figures

INVENTORS:
GERRIT LUTEN
RONALD ARTHUR OLSON
BY: [signature]
ATTORNEY

TELEVISION PICTURE MONITOR CAPABLE OF MEASURING A PLURALITY OF SIGNALS

BACKGROUND OF THE INVENTION

The present invention relates to a television picture monitor apparatus capable of measuring either one of a plurality of input television input signals connected to a plurality of input connectors as well as the differences between either two thereof.

Hitherto, a television picture monitor apparatus is employed, for example, for each television camera whose output signal is monitored, however it is not always necessary to monitor the camera and it is preferable to monitor a pluralty of television signals by a single picture monitor apparatus in a time sharing manner. A conventional television picture monitor apparatus has, in general, a single input coaxial connector on the rear panel thereof. This results in inconvenience to measure a plurality of television signals by a single television picture monitor apparatus because it requires considerable time to disconnect and connect such signal sources to the coaxial connector.

In addition to the abovementioned plural signal measuring capability, there are some applications to measure the differences in time and color characteristics between a pair of television signals. However, no such television picture monitor apparatus has been proposed.

SUMMARY OF THE INVENTION

According to the present invention, a plurality of input coaxial connectors and input circuits are provided in a single television picture monitor apparatus. Such input signals provided to the input coaxial connectors are selectably switched by a switch provided on a front panel of the television picture monitor apparatus such that either one or differences between either two of the input television signals can be selected conveniently.

It is therefore one object of the present invention to provide an improved television picture monitor apparatus capable of monitoring a plurality of input television signals without replacing the input television signals.

It is another object of the present invention to provide a television picture monitor apparatus capable of measuring differences in time and color characteristics between two input television signals.

It is still another object of the present invention to provide a television picture monitor apparatus capable of measuring differences between two input television signals without introducing noise.

It is a further object of the present invention to provide a picture monitor apparatus for comparing the difference between two image signals.

It is yet another object of the present invention to provide a television picture monitor apparatus which is versatile and easy to operate.

The subject matter of the present invention is particularly pointed out and distinctly claimed in the following description. The invention, however, both as to organization and method of operation together with further advantages and objects thereof may best be understood by reference to the following description taken in connection with the accompanying drawings wherein like reference characters refer to like elements.

DETAILED DESCRIPTION OF PREFERRED EMBODIMENTS

A detailed description of the present invention will be given hereinafter in accordance with the accompanying drawings.

Figure 1:
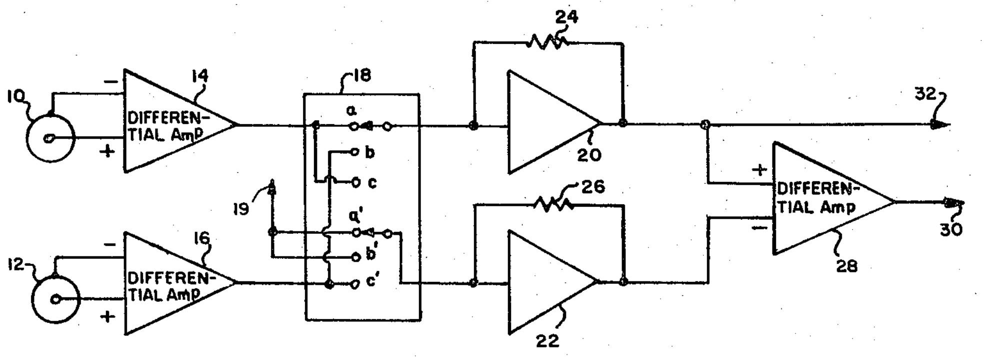
FIG. 1 is a block diagram of an important portion of a television picture monitor apparatus according to the present invention.

FIG. 1 is a block diagram of an input circuitry of a television picture monitor apparatus having a pair of input circuits. In FIG. 1, a pair of similar input coaxial connectors 10 and 12 having, for example, 75 ohm characteristic impedance are suitably provided on a rear panel of the television picture monitor apparatus to receive a pair of input television signals. A pair of similar input differential amplifiers 14 and 16 have a pair of input terminals which are connected to inner and outer conductors of the input coaxial connectors 10 and 12 respectively. A switching circuit 18 receives the outputs from the input differential amplifiers 14 and 16 so that either one or the difference between first and second input signals respectively applied to the input connectors 10 and 12 is transmitted to the following stage comprising a pair of operational amplifiers 20 and 22. The switching circuit 18 can be either a mechanical or an electronic switch which will be operated by a control switch provided either on the front panel of the monitor apparatus or remotely located. The operational amplifiers 20 and 22 include respectively feedback resistors 24 and 26. The outputs from the operational amplifier 20 and 22 are respectively connected to positive and negative inputs of an output differential amplifier 28. Although it is not shown in FIG. 1, the output from the output differential amplifier 28 is then supplied to a control grid or a cathode of a cathode ray tube via an output terminal 30. The output from the operational amplifier 20 is also connected to a terminal 32 for supplying a SYNC signal to a horizontal circuit (not shown) of the television picture monitor apparatus.

When the switching circuit 18 illustrated as a mechanical switch is selected to a first position defined as *a*, the input terminal of the operational amplifier 20 is connected to the *a* position to receive the first input signal through the input differential amplifier 14, while the input terminal of the operational amplifier 22 is connected to *a* position coupled to a voltage source 19. Thus, the first television signal will be displayed on the television picture monitor apparatus. Similarly, if the switching circuit 18 is set to the second position, the operational amplifier 20 receives the second television signal and the operational amplifier 22 is connected to the suitable voltage source 19. As a result, only the second television signal applied to the input coaxial connector 12 is monitored by the television picture monitor apparatus. On the other hand, the input terminals of the operational amplifiers 20 and 22 receive the first and the second television signals respectively when the switching circuit 18 is selected to the third position.

Thus, the difference between the first and second input television signals appears at the output terminal 30. If the first and second input television signals are completely identical, no bright picture will be reproduced on the screen of the television picture monitor apparatus. In other words, the brightness of bright spots or areas displayed on the screen represents the difference in amplitude between the two input signals and the color of the displayed spots or areas represents the difference in color characteristics therebetween.

The first television signal will be transmitted to the terminal 32 for obtaining the SYNC signal therefrom when the switching circuit 18 is set either at the first or the third position. On the other hand, the second television signal will be transmitted to the terminal 32 when the second position is selected by the switching circuit 18. Accordingly, the first input television signal will be the reference signal in the difference mode.

It should be noted that no common mode signals between not only the inner and outer conductors of the first and second input signals but also the first and second signals will appear at the output terminal 30 because of the differential amplifiers 14, 16 and 28 in the third position of the switching circuit 18.

Figure 2:
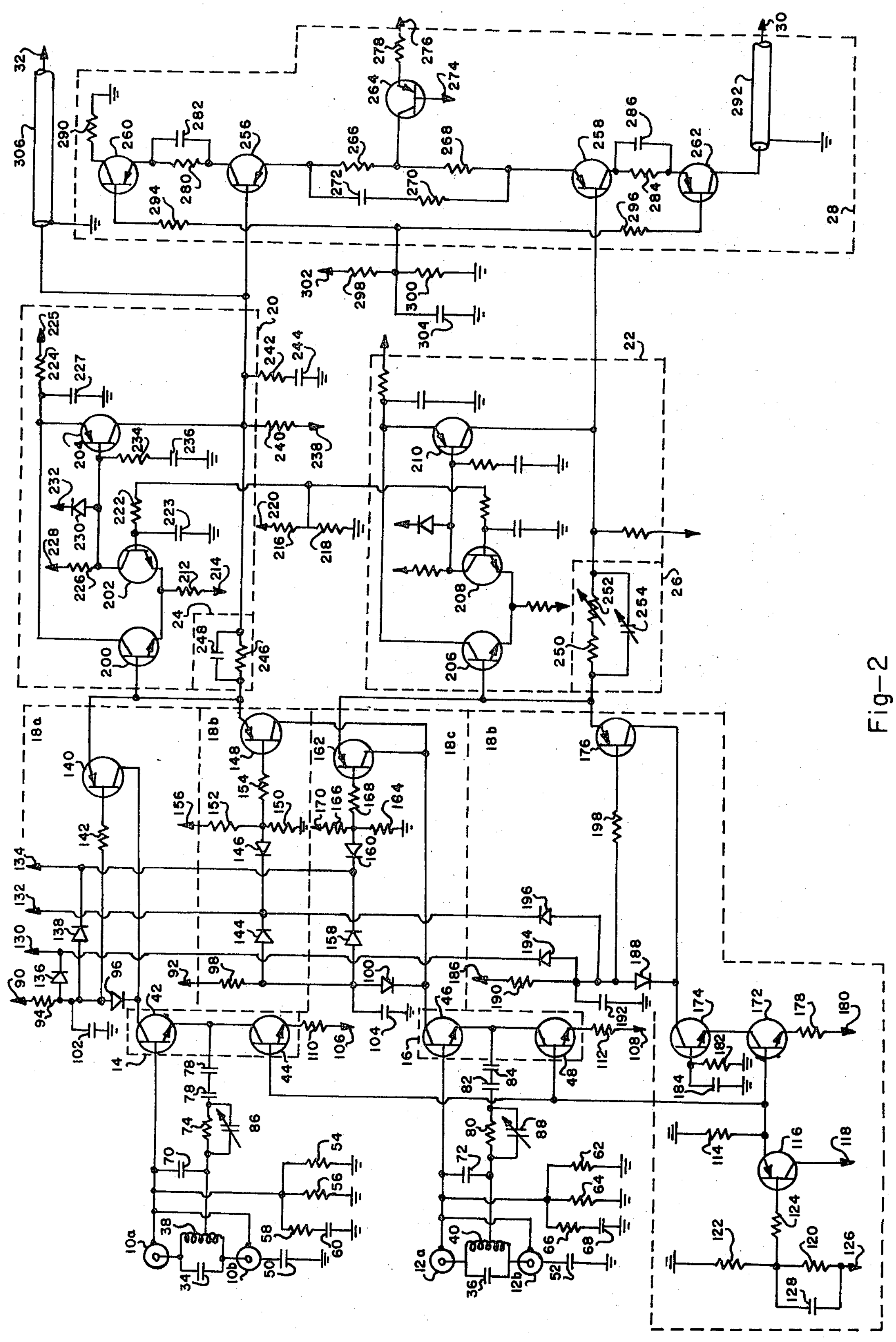
FIG. 2 is a schematic diagram of the important portion of a television picture monitor apparatus as illustrated in block diagram in FIG. 1.

Detailed operation and construction of FIG. 1 will be understood by reference to FIG. 2 which illustrates a circuit schematic of FIG. 1. In FIG. 2, each input coaxial connector 10 and 12 consists of a pair of connectors 10*a*, 10*b* and 12*a*, 12*b*. The coaxial connectors 10*a* and 12*a* are connected to the signal sources and the other connectors 10*b* and 12*b* are connected to a utilization circuit (not shown). Parallel combinations of a capacitor 34 and an inductor 38 and of a capacitor 36 and an inductor 40 are connected respectively between the inner conductors of the first input and output connectors 10*a* and 10*b* and the second input and output connectors 12*a* and 12*b*. The inductors 38 and 40 can be formed by spiral conductors provided on a circuit board. The outer conductors of the input connectors 10*a* and 10*b* are returned to ground through capacitors 50 and 60 and resistors 54, 56 and 58 and also connected to the base of a transistor 42 which forms an input differential amplifier 14 together with a transistor 44. Similarly, the outer conductor of the connectors 12*a* and 12*b* are returned to ground through capacitors 52 and 68 and resistors 62, 64 and 66 and also connected to the base of a transistor 46 which forms an input differential amplifier 16 together with a transistor 48. Capacitors 70 and 72 are connected respectively between the outer conductor of the connector 10*a* and the center tap of the inductor 38 and the outer conductor of the connector 12*a* and the center tap of the inductor 40.

A resistor 74 and capacitors 76, 78 and 86 are connected between the center tap of the inductor 38 and the common junction of the emitter of the transistor 42 and the collector of the transistor 44. Similarly, a resistor 80 and capacitors 82, 84 and 88 are connected between the center tap of the inductor 40 and the common junction of the emitter of the transistor 46 and the collector of the transistor 48. The variable capacitors 86 and 88 connected across the resistors 74 and 80 respectively adjust the input impedances for the input differential amplifiers 14 and 16 as well as the operational amplifiers 20 and 22.

The collectors of the transistors 42 and 46 are connected to similar positive voltage sources 90 and 92 via a resistor 94 and a diode 96 and via a resistor 98 and a diode 100 respectively. The common junctions of the resistor 94 and the diode 96 and of the resistor 98 and the diode 100 are returned to ground through capacitors 102 and 104 respectively. The emitters of the transistors 44 and 48 are returned to similar negative voltage sources 106 and 108 via resistors 110 and 112 respectively. The bases of the transistors 44 and 48 are commonly connected to a voltage divider consisting of a resistor 114 and the emitter-collector junction of a transistor 116 whose collector is connected to a suitable negative voltage source 118. The base bias circuit for the transistor 116 consists of resistors 120, 122 and 124, a capacitor 128 and a suitable negative voltage source 126.

Because of the fixed base bias of the transistor 116, all transistors 44, 48 and 116 operate as constant current sources. As a result, the transistors 42 and 46 provide substantially constant quiescent current flow determined respectively by the constant current sources including transistors 44 and 48. Thus, the collector-emitter currents of the transistors 42 and 46 are responsive to the voltage differences between the base and emitter thereof rather than the absolute voltages at the base and emitter thereof. This reduces the common mode signal or noises of the amplifiers 14 and 16.

The switching circuit 18 includes four electronic switching circuits 18*a*, 18*b*, 18*c* and 18*d* which are selectably controlled by control lines 130, 132 and 134. The electronic switching circuit 18*a* is connected to the common junction of the resistor 94 and the diode 96 and includes a pair of diodes 136 and 138 connected respectively to the control lines 130 and 134 and also a transistor 140 whose base is connected to the common junction via a resistor 142. The collectors of the transistors 42 and 140 are connected together with each other, while the emitter thereof is connected to the input of the operational amplifier 20. The electronic switching circuit 18*b* includes a pair of diodes 144 and 146 and a transistor 148. The diode 144 is connected between the common junction of the resistor 98 and the diode 100 and the control line 132. THe diode 146 is connected between the control line 132 and a base bias circuit for the transistor 148. The base bias circuit for the transistor 148 includes resistors 150, 152 and 154 and a suitable positive voltage source 156. Similarly, the electronic switching circuit 18*c* includes a pair of diodes 158 and 160, a transistor 162 and a base bias circuit therefore consisting of resistors 164, 166 and 168 and a suitable positive voltage source 170. The anode of the diode 158 is connected to the common junction of the resistor 98 and the diode 100. The cathodes of the diodes 158 and 160 are connected to the control line 134. The collectors of the transistors 46, 148 and 162 are coupled together with one another. The emitter of the transistor 148 is connected to the input of the operational amplifier 20, while the emitter of the transistor 162 is connected to the input of the operational amplifier 22. The electronic switching circuit 18*d* is, however, different from the other three electronic switching circuits 18*a*, 18*b* and 18*c*. Transistors 172, 174 and 176 are employed. The transistors 172 and 174 correspond to the differential amplifiers 14 and 16. The base of the transistor 172 is connected to the bases of the transistors 44 and 48 and the emitter thereof is returned to a suitable negative voltage source 180 through a resistor 178. The collector of the transistor 172 is connected to the emitter of the transistor 174 whose base is returned to ground through a resistor 182 and a capacitor 184. The collector of the transistor 174 is connected to the collector of the transistor 176 and also connected to a suitable voltage source 186 through a diode 188 and a resistor 190. The common junction of the resistor 190 and the diode 188 is connected to a capacitor 192, a pair of diodes 194 and 196 and a resistor 198 which are respectively connected to ground, the control lines 130 and 132 and the base of the transistor 176. The emitter of the transistor 176 is connected to the input of the operational amplifier 22. The operation of these electronic switching circuits 18*a*, 18*b*, 18*c* and 18*d* is explained hereinafter.

When a control line 130 is actuated or connected to a suitable potential which is more negative than the voltages at the common junctions of the resistor 94 and the diode 96 and of the resistor 190 and the diode 188, the transistors 140 and 176 are rendered conductive while the transistors 148 and 162 remain nonconductive. Thus, the input current for the operational amplifier 20 flows through the transistor 140 which is carrying the current responsive to the first input television signal. When the control line 132 is actuated, the transistors 148 and 176 are conductive and the transistors 140 and 162 remain nonconductive for transmitting the collector current of the transistor 46 to the operational amplifier 20 through the transistor 148. As a result, the operational amplifier 22 does not receive any signal current. When the control line 134 is selected, the transistors 140 and 162 are rendered conductive while the transistors 148 and 176 remain nonconductive. Thus, the first and second input television signals will be transmitted to the operational amplifiers 20 and 22 via the transistors 140 and 162 respectively. Consequently, the difference or the subtraction between the first and second input television signals will be transmitted to the output terminal 30 as it will be understood from the following description.

The operational amplifiers 20 and 22 are essentially the same and each includes transistors 200, 202 and 204 and transistors 206, 208 and 210. For simplicity, description will be given about the operational amplifier 20. The base of the input transistor 200 receives emitter current from either the transistor 140 or 148. The transistors 200 and 202 form an emitter coupled differential amplifier whose emitters are returned to a suitable negative voltage source 214 through a resistor 212. The base of the transistor 202 is connected to a voltage divider comprising a pair of resistors 216 and 218 and a suitable voltage source 220 through a resistor 222. The base thereof is also returned to ground through a capacitor 223. The collectors of the transistors 200 and 202 are connected respectively to suitable voltage sources 225 and 228 through load resistors 224 and 226. The collector of the transistor 202 is connected to the base of the transistor 204 and also connected respectively to a suitable voltage source 232 and ground via a protection diode 230 and series combination of a resistor 234 and a capacitor 236. The collector of the transistor 204 is connected to a suitable voltage source 238 through a load resistor 240. A phase compensation network including a resistor 242 and a capacitor 244 is connected between the collector of the transistor 204 and ground. A capacitor 227 connected between the emitter of the transistor 204 and ground is an AC bypass for the collector and emitter of the transistors 200 and 204 respectively. The feedback impedance 24 for the operational amplifier 20 consists of a resistor 246 and a capacitor 248. However, the feedback impedance 26 for the operational amplifier 22 consists of a resistor 250, a variable resistor 252 and a variable capacitor 254 shunted across the resistors 250 and 252. The variable resistor 252 and the variable capacitor 254 adjust the DC and AC gain of the operational amplifier 22 such that both gains of the operational amplifiers 20 and 22 will be identical over a broad frequency bandwidth.

The balanced outputs from the operational amplifiers 20 and 22 are then applied to positive and negative input terminals of the output differential amplifier 28 respectively. The output differential amplifier 28 consists of transistors 256, 258, 260, 262 and 264 and associated circuit components. The bases of the transistors 256 and 258 are input terminals. The emitters of the transistors 256 and 258 are coupled together through a pair of resistors 266 and 268 and a series combination of a resistor 270 and a capacitor 272. The common junction of the resistors 266 and 268 is connected to the collector of the transistor 264 whose base is connected to a suitable voltage source 274 and whose emitter is connected to a positive voltage source 276 through a resistor 278. The collectors of the transistors 256 and 258 are connected to the emitters of the transistors 260 and 262 through parallel combinations of a resistor 280 and a capacitor 282 and of a resistor 284 and a capacitor 286. The collector of the transistor 260 is returned to ground through a resistor 290. The collector of the transistor 262 is connected to the output terminal 30 through a coaxial cable 292. The bases of the transistors 260 and 262 are coupled together through a pair of resistors 294 and 296 whose common junction is connected to a suitable bias voltage consisting of a pair of resistors 298 and 300, a positive voltage source 302 and a capacitor 304. A coaxial cable 306 is connected to the collector of the transistor 204 for transmitting the signal to the terminal 32.

The transistor 264 operates as a constant current source to the output differential amplifier 28. The transistors 260 and 262 operate respectively as load resistors for the transistors 256 and 258. The output signal at the output terminal 30 is the same polarity as the base input signal of the transistor 256. The capacitor 272 and the resistor 270 enhance high frequency signal components of the input signals. Because of the constant current source including the transistor 264, the common mode signal at the bases of the transistors 256 and 258 is reduced significantly. Thus, very accurate differences in time and color characteristics are derived at the output terminal 30.

Figure 3:
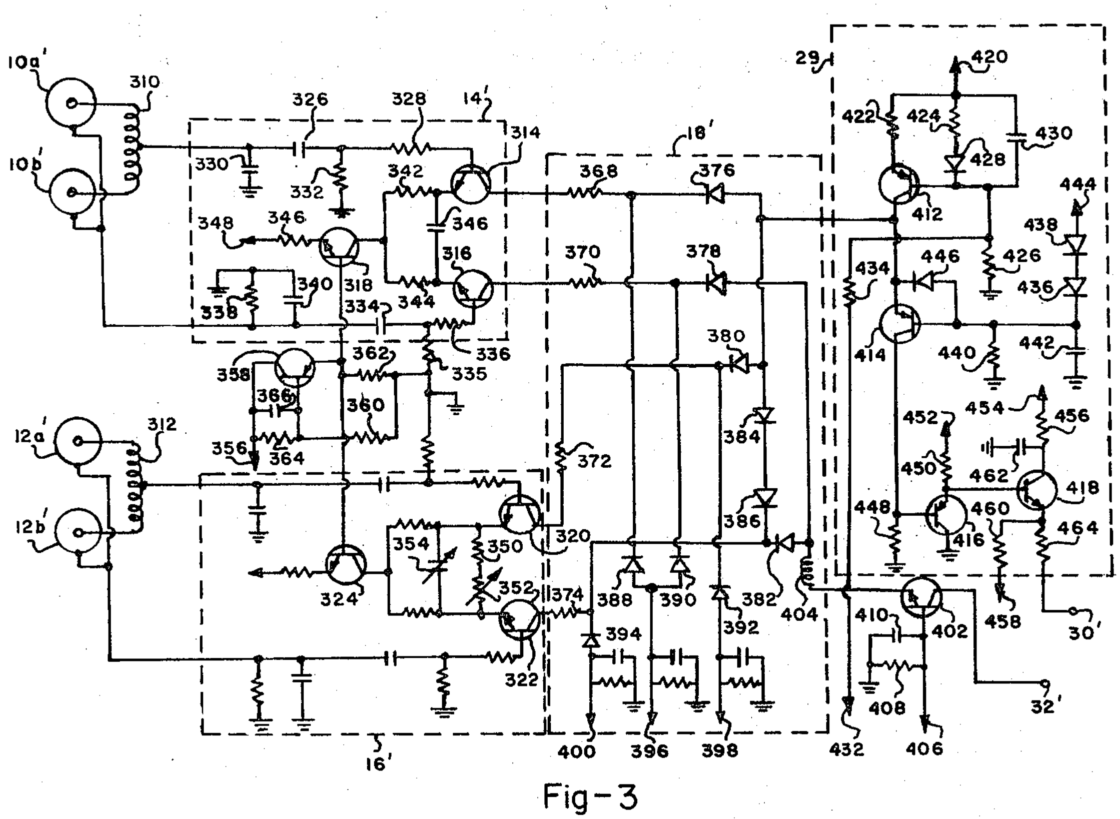
FIG. 3 is a schematic diagram of another embodiment of the present invention.

FIG. 3 illustrates a circuit schematic of another embodiment of an input circuitry of a television picture monitor apparatus according to the present invention. Although no operational amplifier 20 nor 22 nor differential amplifier 28 of FIG. 1 is employed in this embodiment, FIG. 3 operates to produce essentially the same objectives as the circuit in FIG. 2.

A pair of input terminals 10*a'* and 10*b'* are respectively coaxial connectors for receiving a first input signal and for transmitting the first input signal to a utilization circuit (not shown). Similarly, a pair of input terminals 12*a'* and 12*b'* are coaxial connectors for receiving a second input signal and for transmitting the same to a utilization circuit (not shown). The inner conductors of the connectors 10*a'* and 10*b'* as well as 12*a'* and 12*b'* are connected together through center-tapped inductors 310 and 312 respectively.

The input differential amplifiers 14' and 16' include respectively three transistors 314, 316 and 318 and three transistors 320, 322 and 324, among other associated circuit components. The center tap of the inductor 310 is connected to the base of the transistor 314 through a capacitor 326 and a resistor 328. Both terminals of the capacitor 326 are returned to ground via a capacitor 330 and a resistor 332. The outer conductors of the coaxial connectors 10*a'* and 10*b'* are connected to the base of the transistor 316 via a capacitor 334 and a resistor 336. The outer conductors of the connectors 10*a'* and 10*b'* are also returned to ground through a resistor 338 and a capacitor 340. The common junction of the capacitor 334 and the resistor 336 is returned to ground via a resistor 335. The emitters of the transistors 314 and 316 are coupled together via a pair of resistors 342 and 344 and also via a capacitor 346. The common junction of the resistors 342 and 344 is connected to the collector of the transistor 318 whose emitter is returned to a negative voltage source 348 through a resistor 346.

The input differential amplifier 16' is essentially the same as the input differential amplifier 14' except that emitters of the transistors 320 and 322 are connected together through a resistor 350 and a variable resistor 352. A capacitor 354 connected across the resistors 350 and 352 is variable. The bases of the transistors 318 and 324 are connected together and also returned to a suitable negative voltage source 356 through an emitter-collector junction of a transistor 358. A bias circuit for the transistor 358 includes resistors 360, 362 and 364 and a capacitor 366. Negative and positive outputs are produced respectively at the collectors of the transistors 314 and 316. The resistors 342 and 344 connected to the emitters of the transistors 314 and 316 determine the gains of the respective transistors 314 and 316. The capacitor 346 enhances high frequency components of the input signal applied to the input coaxial connector 10*a'*. As a fixed bias voltage is applied to the bases of the transistors 318 and 324, these transistors operate as constant current sources for eliminating the common mode signals applied to the bases of the transistors 314 and 316.

The operation of the input differential amplifier 16' is similar to the input differential amplifier 14'. However, the variable capacitor 354 and the variable resistor 352 will be calibrated such that the gains of the amplifiers 14' and 16' are equal in order to obtain high differential characteristics.

The collectors of the transistors 314, 316, 320 and 322 are connected to the switching circuit 18' through resistors 368, 370, 372 and 374 respectively. The switching circuit 18' includes diodes 376, 378, 380 and 382 which are connected respectively in series with the collector load resistors 368, 370, 372 and 374. The other ends of the diodes 376 and 380 are connected together with each other. The anode of the diode 380 and the cathode of the diode 382 are connected together through a pair of diodes 384 and 386. The cathodes of diodes 388, 390, 392 and 394 are connected respectively to the cathodes of the diodes 376, 378, 380 and 382. The anodes of the diodes 388 and 390 are connected together to a control line 396. The anodes of the diodes 392 and 394 are connected to control lines 398 and 400 respectively. The anodes of the diodes 378 and 382 are connected to the emitter of a transistor 402 through an inductor 404. The base of the transistor 402 is connected to a control line 406 and also returned to ground through a resistor 408 and a capacitor 410. The collector of the transistor 402 is connected to the terminal 32' for deriving a SYNC signal. The operation of the switching circuit will be understood from the following description.

In the case when only the first input television signal is monitored, a positive voltage is applied to the control lines 398 and 400 such that the diodes 392 and 394 are rendered conductive to cancel the outputs from transistors 320 and 322. Consequently, the collector current from the transistor 314 is transmitted via diode 376 to the output amplifier 29, which is described in detail hereinafter, and a SYNC signal is supplied from the transistor 316 via diode 378. When the second input television signal is selected, a positive voltage is now applied to the control line 396 instead of the control lines 398 and 400. Thus, the diodes 388 and 390 are rendered conductive to cancel the outputs from the transistors 314 and 316 and the outputs from the transistors 320 and 322 are transmitted to the output amplifier 29 and the transistor 402 respectively. In the previous two modes, the base voltage of the transistor 402 is held at a predetermined relatively high voltage. In a third mode when the difference between the first and second input signals is monitored, a positive voltage is applied to the control line 398 to render the diode 392 conductive to cancel the output from transistor 320. Accordingly, the outputs from the transistors 314 via diode 376 and 322 via diodes 386 and 384 are supplied to the output amplifier 29. The output from the transistor 316 is applied to the transistor 402. In the last mentioned mode, the voltage to the control line 406 is selected to a relatively lower value so that the diode 382 does not conduct.

The output amplifier 29 includes four transistors 412, 414, 416 and 418. The transistor 412 operates as a constant current source because a fixed bias is applied to the base thereof. The bias circuit for the transistor 412 includes a positive voltage source 420, resistors 422, 424 and 426, a diode 428 and a capacitor 430. A control line 432 is connected to the base of the transistor 412 through a resistor 434. The input terminal of the output amplifier 29, which is the common junction of the collector of the transistor 412 and the emitter of the transistor 414, is a current summing point because the input impedance of the common base transistor 414 is very low. The base of the transistor 414 is connected to a bias circuit comprising a pair of diodes 436 and 438, a resistor 440, a capacitor 442 and a suitable positive voltage source 444. A diode 446 is connected between the emitter and base electrode of the transistor 414 for reverse voltage protection. The voltage across a collector resistor 448 of the transistor 414 is applied to the emitter follower transistor 416 including an emitter load resistor 450 connected to a positive voltage source 452. The current output of the transistor 416 is also amplified by the emitter follower transistor 418 whose collector is connected to a positive voltage source 454 through a resistor 456 and whose emitter is returned to a suitable voltage source 458 via an emitter load resistor 460. The collector of the transistor 418 is returned to ground through a capacitor 462 for bypassing high frequency components. The output terminal 30' is connected to the emitter of the transistor 418 through a resistor 464.

Although it is not discussed in the previous description, the control line 432 is connected to a lower voltage source to increase the current of the constant current source incuding the transistor 412 during the differential mode of operation. Because of the addition of the outputs from the transistors 314 and 322 which are respectively the opposite polarity to the first input signal and the same polarity as the second input signal, the common mode signal therebetween will be cancelled out without employing any conventional differential amplifiers.

As is understood from the foregoing description, the present television picture monitor apparatus is especially useful for measuring or monitoring a plurality of input video signals independently or the differences between either two of the input video signals without replacing such input signal sources and also without introducing any noise. Although the above embodiments have only two input television signals, the present invention is not limited to such embodiments. It is obvious for those skilled in the art to make various modifications or applications without departing from the spirit and scope of the present invention. For example, the present invention can be used for comparing two samples photographically by employing a pair of television cameras and the television picture monitor apparatus according to the present invention.

What is claimed is:

1. In a television picture monitor apparatus for monitoring input television signals continuously in the real time domain:

a plurality of input means, each of which includes at least a pair of terminal means for receiving the input television signals;

differential amplifier means connected to said terminal means for linearly amplifying said input television signals received thereby;

switching means connected to said differential amplifier means for selecting either one or all of said linearly amplified input television signals; and linear output amplifier means connected to said switching means for amplifying said selected linearly amplified input television signals so that the selected linearly amplified input television signals or the differences in characteristics between the selected linearly amplified input television signals are monitored by the television picture monitor apparatus.

2. The apparatus according to claim 1 wherein said differential amplifier defines a transistor whose base and emitter are connected to different terminals of said pair of terminal means via direct and impedance means respectively for reducing hum components of said input television signals applied therebetween.

3. The apparatus according to claim 2 further comprising operational amplifier means connected to the collector of said transistor, said transistor and impedance means forming a portion of a gain determining network for linearly amplifying said input television signals.

4. The apparatus according to claim 1 wherein said switching means includes a source of DC voltage obtained by switch means mountably attached to a front-panel portion of said apparatus.

5. In a television picture monitor apparatus for monitoring input television signals continuously in the real time domain:

at least two linear input differential amplifier means connected for receiving a reference video signal and at least one input video signal; and a linear output amplifier means connected to said differential amplifier means for selectively adding together the outputs of said reference video signal and one of said input video signal whereby the difference in characteristics between said reference video signal and one of said input video signal is monitored.

6. The apparatus according to claim 5 further including at least two television cameras operated in synchronism with each other for producing said reference video signal and said input video signal.

7. The apparatus according to claim 5 further including switching means mountably attached to a front panel portion of said apparatus for selecting the monitored signal.

* * * * *